United States Patent [19]
Kiyohara et al.

[11] Patent Number: 5,694,577
[45] Date of Patent: Dec. 2, 1997

[54] MEMORY CONFLICT BUFFER FOR ACHIEVING MEMORY DISAMBIGUATION IN COMPILE-TIME CODE SCHEDULE

[75] Inventors: Tokuzo Kiyohara, Osaka-fu, Japan; Wen-mei W. Hwu, Champaign, Ill.; William Chen, Sunnyvale, Calif.

[73] Assignees: Matsushita Electric Industrial Co., Ltd., Osaka-fu, Japan; The Board of Trustees of the University of Illinois, Urbana, Ill.

[21] Appl. No.: 470,825

[22] Filed: Jun. 6, 1995

[51] Int. Cl.$^6$ .............................. G06F 13/00; G06F 12/00
[52] U.S. Cl. ......................... 395/494; 395/445; 395/455; 395/471; 395/472; 395/481; 364/DIG. 1
[58] Field of Search ........................... 395/445, 455, 395/471, 472, 481, 494

[56] References Cited

FOREIGN PATENT DOCUMENTS

| 2265481 | 3/1992 | United Kingdom . |
| 2270781 | 9/1992 | United Kingdom . |

OTHER PUBLICATIONS

"Dynamic Memory Disambiguation Using The Memory Conflict Buffer", David M. Gallagher et al., Aspolos VI Proceedings on Architectual Support For Programming Languages And Operating Systems, Sixth International Conference, San Jose, CA, Oct. 4–7, 1994, pp. 183–193.

*Primary Examiner*—Frank J. Asta
*Attorney, Agent, or Firm*—Wenderoth, Lind & Ponack

[57] ABSTRACT

An apparatus is provided, for use in a computer having a register bank and a device for operand fetch and instruction execution, for monitoring a store address to maintain coherency of preloaded data that is fetched by a load operation and should be effected by at least one subsequent store operation. The apparatus includes an address register bank having entries for holding the address of a load having loaded data which should be affected by at least one subsequent store operation. Each of the entries has associated therewith a pre-load flag and a type field, the pre-load flag being set when the load is executed and reset when there is no need to be affected by a subsequent store operation. The apparatus is further configured to compare the address held in the register bank with the address of a subsequent store operation in consideration of the access type held in the type of field when the pre-load flag is set, and to reset the pre-load flag when special operation which terminate monitoring addresses are detected or the value is updated by non-preload operations. Each of the entries has further associated therewith a retry flag set when the preloaded data is invalid and reloading is required at the point of usage.

13 Claims, 5 Drawing Sheets

R1 = R2 + R3
R4 = M(R5+R8)   (preload)
R6 = R4 + 1
M(R9+R10) = R11
M(R3+R7) = R1
Check R4, Correction Back:

Correction:  R4 = M(R5+R8)
               R6 = R4 + 1
               Jmp Back

R3 = M (R2)
R4 = R4 / R3
M (R1) = 7
Check R3, Correction

R1 = R2 + R3
M(R9+R10) = R11
M(R3+R7) = R1
R4 = M(R5+R8)
Check R4, -
R6 = R4 + 1
M(R9) = 0
R20 = R10 + 1

FIG. 5(c)

R1 = R2 + R3
          R4 = M(R5+R8)  (preload)
          R6 = R4 + 1
          M(R9+R10) = R11
          M(R3+R7) = R1
          Check R4, Correction
          M(R9) = 0
          R20 = R10 + 1

Correction: R4 = M(R5+R8)
              R6 = R4 + 1
              Jmp Tail_Dup Tail_dup:  M(R9) = 0

R1 = R2 + R3
          R4 = M(R5+R8)  (preload)
          R6 = R4 + 1
          M(R9+R10) = R11
          M(R3+R7) = R1
          Check R4, Correction Back:  M(R9) = 0
        R20 = R10 + 1

Correction:  R4 = M(R5+R8)
                R6 = R4 + 1
                Jmp Back

MEMORY CONFLICT BUFFER FOR ACHIEVING MEMORY DISAMBIGUATION IN COMPILE-TIME CODE SCHEDULE

BACKGROUND OF THE INVENTION

1. Field of the Invention

The present invention relates to a hardware mechanism, referred to as the memory conflict buffer, which facilitates static code scheduling in the presence of memory store/load dependencies. Correct program execution is ensured by the memory conflict buffer and repair code provided by a compiler.

2. Description of the Related Art

In order to increase performance, multiple instruction issue processors, such as VLIW and superscalar processors, exploit fine grain parallelism inherent to applications. The performance of superscalar processors, however, is more sensitive to data load latency than their single instruction issue predecessors. A superscalar processor can lose over 30% of its performance when the latency for a data load is increased from 1 to 2 cycles.

A compile-time code scheduler improves the performance of VLIW and superscalar processors by exposing simultaneously executable instructions to the hardware. To be effective, the scheduler must be able to freely reorder instructions within the scheduling scope. Unfortunately, code reordering is often inhibited by ambiguous memory dependencies, the situation where the relationship between a pair of memory references cannot be determined accurately at compile time. Because memory dependencies often occur on program critical paths, such loss of code reordering opportunities can severely impair the effectiveness of code scheduling.

The problem of ambiguous memory dependencies can be addressed by static dependence analysis, dynamic memory disambiguation, or some combination of the two. Static dependence analysis attempts to determine, at compile time, the relationship between pairs of memory references. In many cases, this analysis is able to determine the reference pairs are either definitely dependent or definitely independent, enabling the compiler to perform optimizations or code reordering. However, static analysis is limited in two situations (1) when memory dependencies are truly ambiguous at compile times; or (2) when the reference pairs are sometimes dependent during execution, e.g., only for some loop iterations. Additionally, accurate static analysis requires a significant compile time investment and may be inappropriate for some applications.

Dynamic memory disambiguation resolves memory dependencies during program execution. It is a viable alternative when sophisticated static analysis is not available, when rapid compilation is required, or when the application is dominated by references for which static analysis is ineffective. Both hardware and software approaches to dynamic disambiguation have been proposed. Out-of-order execution architectures allow the instruction issue unit to calculate run-time memory addresses and reorder memory operations based upon actual dependence [P. P. Change, W. Y. Chen, S. A. Mahlke, and W. W. Hwu, "Comparing static and dynamic code scheduling for multiple-instruction-issue processors," in *Proceedings of the 21th Annual International Symposium on Microarchitecture*, pp. 25–33, November 1991.]. However, the code reordering in these architectures is limited by the size of the visible instruction window.

Figure 1A:
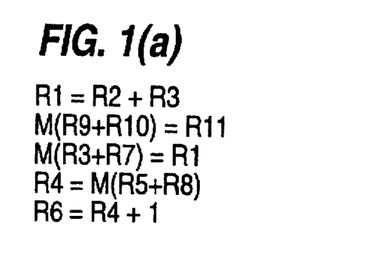
FIG. 1(a) and 1(b) respectively illustrate original code and run-time code in an example of a conventional run-time memory disambiguation.
Figure 1B:
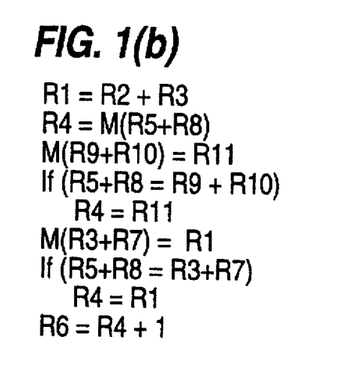

A software-only approach to dynamic disambiguation is run-time disambiguation proposed by Nicolau [A. Nicolau, "Run-time disambiguation; coping with statically unpredictable dependencies," *IEEE Transactions on Computers*, vol. 38, pp. 663–678, May 1989.]. By inserting explicit address comparison and conditional branch instructions, run-time memory disambiguation allows general code movement across ambiguous memory stores. The approach is illustrated in FIG. 1. The original code segment in FIG. 1(a) has a load following two ambiguous stores, i.e., the relation between the locations accessed by the load and by the stores cannot be statically determined at compile time. In FIG. 1(b), the load has been moved above both stores, and explicit address comparison code has been added. With run-time disambiguation, however, the number of address comparison and conditional branch instructions inserted can be prohibitive as a result of aggressive code reordering; if m loads bypass n stores, m×n comparisons and branches would be required.

SUMMARY OF THE INVENTION

Figure 2A:
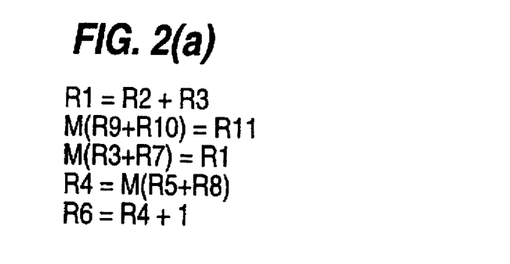
FIG. 2(a) and 2(b) respectively illustrate original code and MCB code in an example of the memory conflict buffer of the present invention.
Figure 2B:
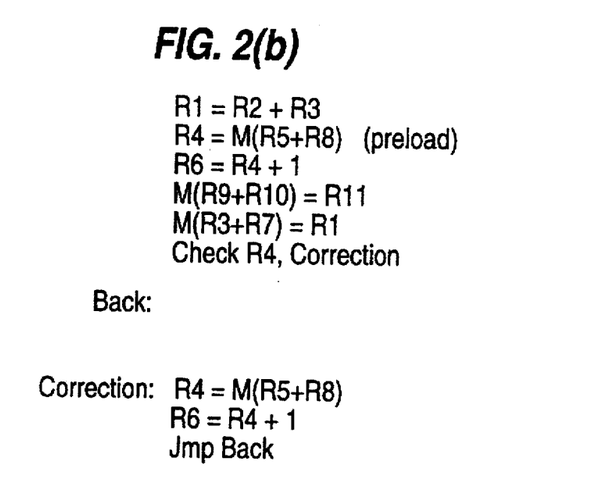

The Memory Conflict Buffer (MCB) scheme of the present invention extends the idea of run-time memory disambiguation by introducing a set of hardware features to eliminate the need for explicit address comparison instructions. The MCB approach involves the introduction of at most two new instructions: (1) preload, which performs a normal load operation, but signals the hardware that a possible dependence violation, or conflict, exists for this load; and (2) check, which directs the hardware to determine if a dependence violation has occurred and to branch to conflict correction code is required. FIG. 2 demonstrates the MCB approach using the previous code example. In FIG. 2(b), both the load and its dependent add have bypassed the ambiguous stores. Note the load is now a preload, and a check instruction has been inserted at the original location of the load. If the hardware determines a conflict has occurred, the check instruction will branch to correction code, which re-executes the load and any dependent instructions. In contrast to run-time memory disambiguation, only one check operation is required regardless of the number of store instructions bypassed by the preload. As a result, the MCB scheme allows the compiler to perform aggressive code reordering with significantly less code expansion and execution overhead than run-time disambiguation.

With the introduction of the preload and check opcodes, the compiler is free to move load instructions and their dependent operation past ambiguous stores. The MCB hardware supports such code reordering by (1) detecting the situation in which the ambiguous reference pair access overlapping location and (2) invoking a correction code sequence supplied by the compiler to restore the correctness of program execution. The situation where a preload and an ambiguous store access overlapping locations will be referred to as a conflict between the reference pair. When this occurs, the reordered load and dependent instructions which bypassed the store must be re-executed.

In order to detect conflicts as they occur, the MCB hardware maintains address information for each preload instruction as it is executed. The addresses of subsequent store instructions are then compared to this address information to determine whether a conflict has occurred. The hardware records the occurrence of the conflict; when the corresponding check instruction is encountered, the hardware performs a conditional branch to correction code if a conflict has been recorded. The correction code re-executes necessary instructions and then returns to normal program execution.

The description of MCB thus far implicitly assumes that the loads and their ambiguous stores tend to access nonoverlapping locations. It is also possible to apply the MCB concept to the case where the load is expected to access the same location as an ambiguous store. In the case that the same locations are expected, the value of a store operation is likely to be used instead of the execution of a load operation. In order to allow the stored value to be reused instead of the load value, a special preload is inserted before the ambiguous store. The preload inserts the original load address into the MCB as described before. However, this special preload does not access memory. Furthermore, it sets a flag in MCB so that the ambiguous stores will check for a different conflict condition where a conflict occurs when the two references do not access exactly the same location.

When a conflict condition is detected, the load instruction and its dependent instructions which have been executed thus far must be corrected. Two methods are currently know for this purpose.

In the first method, the compiler generates a new sequence of instructions that consist of the load and its dependent instructions executed before the conflict condition is detected.

In the second method, the processor enters a re-executed mode when a conflict condition is detected. The program counter is rolled back to the preload. Instructions are selectively re-executed until the program state is corrected.

BRIEF DESCRIPTION OF THE DRAWINGS

The present invention will be discussed in more detail below with reference to the accompanying drawings, in which.

DETAILED DESCRIPTION OF THE PREFERRED EMBODIMENTS 1.1 MCB Design

Initially, it is noted that this description is based on likely different loads. Section 1.9 below gives the adjustments needed to apply likely same loads.

The MCB hardware is responsible for storing preload address information for comparison to subsequent store addresses. Perhaps the most direct approach would be to store all address bits in some form of fully-associative structure. However, a fully-associative search for any reasonably-sized MCB implementation would likely impose constraints upon processor pipeline timing. Additionally, the hardware costs to record 32 or more bits of address information for each preload might prove prohibitive.

Figure 3:
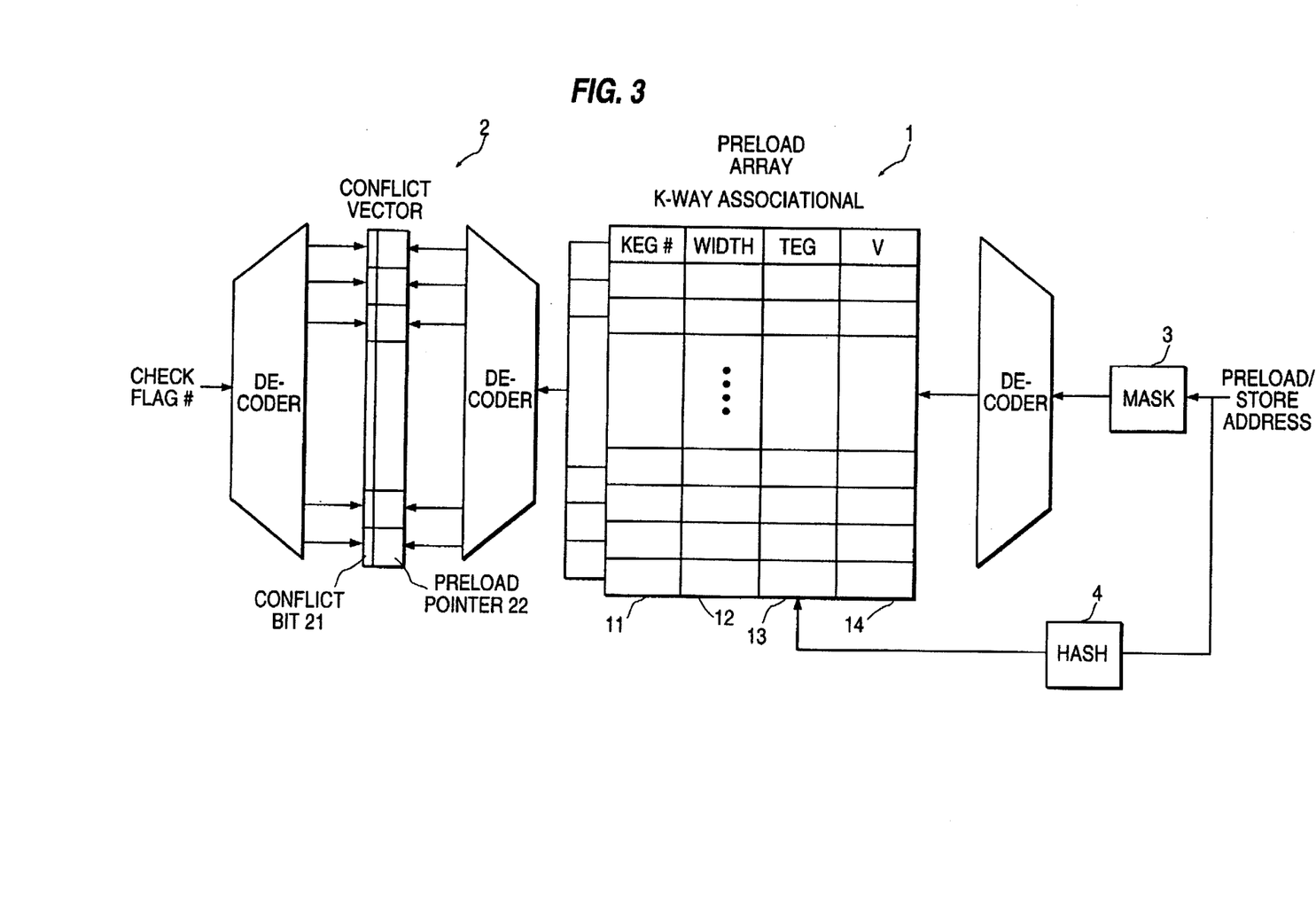
FIG. 3 illustrates a set associative MCB design of the present invention.

The MCB design presented in FIG. 3 was developed with scalability, access time, and physical size constraints in mind. The MCB hardware consists of two primary structures, corresponding to the needs to store address information and to record conflicts which occur: (1) the preload array 1, and (2) the conflict vector 2.

The preload array 1 is a set associative structure similar in design to a cache. Each entry in the preload array contains four fields: (1) the preload destination register number 11; (2) the preload access width 12; (3) an address signature 13; and (4) a valid bit 14 indicating whether the entry currently contains valid data. The preload register field 11 simply contains the register number of the preload destination. The address signature 13 contains bits which contain a hashed version of the preload address. The access width 12 field contains two bits to indicate whether the preload was of type byte, half-word, word, or double word; additionally, this field contains the three least significant bits of the preload address. The use of the access width field will be discussed below.

The conflict vector 2 is equal in length to the number of physical registers, with one entry corresponding to each register. Each entry contains two fields: the conflict bit 21 and the preload pointer 22. The conflict bit 21 is used to record that a conflict has occurred for a preload to this register. The preload pointer 22 specifies which preload array line currently holds the preload associated with this register and allows the preload entries to be invalidated by the check instruction.

When a preload instruction is executed, the address of the preload is hashed at hashing circuit 3 to select which set in the preload array will store the preload. (The hardware to perform this hashing, as well as address signature generation, is detailed below.) The preload array is set-associative; selecting an entry in which to store the preload information is identical to selecting an entry in a set-associative cache. If any entry within the set does not have its valid bit set, the preload information can be placed in this entry. When no invalid entry exists, a replacement algorithm, like a random replacement algorithm, is used to select which entry to replace. If a valid entry is replaced, a load-load conflict has occurred; in this situation we can no longer provide safe disambiguation for the preload which is being removed from the array. We must therefore assume a conflict has occurred for this entry and set the conflict bit corresponding to the register number being removed. Note that for processors which support the execution of multiple preload instructions per cycle, the preload array must be multiported to allow simultaneous insertion of multiple preloads.

Having determined which entry in the preload array will be used for the current preload instruction, the destination register number and access width information are stored in the array. A second independent hashing of the preload address is performed by hashing circuit 4 to create the preload's address signature, which is stored in the signature field of the array. Unlike the tag field of a cache which must provide exact matching, this signature field can be hashed to reduce its size; the MCB can tolerate the occasional false conflicts which result from hashing. Simultaneous with storing the preload in the preload array, the conflict vector associated with the load's destination register is updated, resetting the conflict bit and establishing the pointer back to the preload array.

When a store instruction is executed, its address is hashed identically to the preload to determine the corresponding set in the preload array and to determine the store's address signature. The store's access width data (2 size bits and 3 LSBs) is also presented to the array. The store's signature and access width information are compared with the data stored within each entry of the selected set, to determine whether a conflict has occurred. For each entry in the set which is determined to conflict with the store, the conflict bit corresponding to the preload register is set; this requires that; the conflict vector be multiported to a degree equivalent to the set associativity of the preload array. Two types of conflicts can arise when a store instruction is executed. If the load address and store address were identical or overlap, we say a true conflict has occurred. However, if the two addresses were different, and the conflict resulted from the hashing scheme used, we call this a false load-store conflict.

Thus, bits within the conflict vector can be set in one of three ways: (1) a true conflict; (2) a false load-store conflict resulting from the hashing scheme; or (3) a false load-load conflict resulting from exceeding the set-associativity of the preload array. Regardless of the source of the conflict, the hardware must assume it is valid and execute correction code to ensure program correctness. This is accomplished using the check instruction. The format for the check instruction is check Rd, Label, where Rd is a general purpose register number, and Label specifies the starting address of the correction code supplied by the compiler. When a check instruction is executed, the conflict bit corresponding to Rd is examined. If the conflict bit is set, the processor performs a branch to the correction code marked by Label. The correction code provides for re-execution of the preload and its dependent instructions. A branch instruction at the end of the correction code brings the execution back to the instruction immediately after the check, and normal execution resumes from this point.

The conflict bits are reset in two ways. First, a check instruction resets the conflict bit for register Rd as a side effect. Second, any preload that deposits a value into a general purpose register also resets the corresponding conflict bit. The valid bits within the preload array are reset upon execution of the corresponding check instruction, using the pointer within the conflict vector. Note that in the event the flow of control causes the check instruction not to be executed, the preload valid bits will remain set. However, this causes no performance impact because another preload of the destination register must occur before another check instruction can occur, resetting any spurious conflict.

Note that only preloads, stores, and checks need to access the address registers and the conflict vector. Accesses to the preload array can be performed using the virtual address to avoid address translation delay. For store instructions, these accesses can be performed as soon as the store address is calculated; it is unnecessary to wait until the store data has been compiled. For load instructions, MCB accesses are performed in parallel with the data cache access. Because the MCB is very similar to a cache in design and smaller than most caches, we believe it is unlikely that the MCB will affect the processor pipeline timing. However, further study of MCB timing is required within the context of a specific pipeline architecture.

1.2 MCB Address Hashing

Incoming preload and store addresses are used to select a corresponding set in the preload array. The most direct method to select one of n MCB lines is to simply decode $\log_2 n$ bits of the address. However, testing revealed that this approach resulted in a higher rate of load-load conflicts than a baseline software hashing approach, most likely due to a strided array access patterns causing additional conflicts. As a result, the MCB employs a premutation-based hardware hashing scheme.

Mathematically, our hardware hashing approach can be represented as a binary matrix multiplication problem, where matrix A is a non-singular matrix and hash address= load–address * A. For example, consider the following 4×4 A matrix, used to hash 4-bit addresses:

1001
0010
1110
0101

To mathematically compute the hash address for incoming address 1011, we simply multiply this address by the matrix, obtaining hash address 0010. If matrix A is non-singular, an effective hash of the incoming address is assured [B. R. Rau, "Pseudo-randomly interleaved memory," inProceeding of 18*th International Symposium on Computer Architecture*, pp. 74–83, May 1991.]. When mapping this scheme to hardware, each bit in the hash address is simply computed by XORing several of the incoming address bits, corresponding to the 1's in each column of the matrix. Thus h3, the most significant bit of the hash address, is the XOR of a3 and a1 of the incoming address; h2 is the XOR of a1 and a0, etc. This simple hardware scheme provides excellent hashing with only a small cost in time and hardware.

This same hashing approach is used to generate the address signature for incoming preload and store instructions. The signature is hashed in order to reduce the size of the MCB and to speed signature comparison. The signature is stored in the MCB for each preload, and is compared to the signature for incoming store instructions to determine if a conflict has occurred.

1.3 Handling Variable Access Sizes

Many instructions set architectures allow memory references to have byte addressability and variable access sizes. Thus, there arises the possibility that two memory references could access slightly different addresses, yet actually conflict. For example, the references:

store_int 0x40000000, R2
load_char R1, 0x40000001 represents a true load-store conflict. Although conflicts such as this are rare, they can occur in real code. An example where this might occur is in use of the union construct in the C programming language. To provide correctness, any code reordering scheme based upon memory disambiguation must account for the possibility of conflicts by memory operations with different access widths. One solution to this problem is to legislate it away; hardware designers can simply declare that accessing the same location with different width instruction is a poor programming practice and decide their hardware will not support it. A more general solution would require that any disambiguation technique provide adequate checks to ensure program correctness in the presence of variable width accesses.

To provide this capability, the MCB does not use the three LSBs of preload and store instructions when hashing to select the preload array line corresponding to the memory reference. Instead, these three bits, as well as two bits indicating the access size, are stored within the array for preload instructions. When a store occurs, its five bits are evaluated with the five bits stored for the preload to determine whether a conflict has truly occurred. A simple design for determining conflicts for these two five-bit vectors requires only seven gates and two levels of logic assuming the architecture enforces aligned memory accesses.

1.4 Handling Context Switches

Whenever a general purpose register needs to be saved to the memory due to context switches, neither the conflict vector nor the preload array must be saved. The only requirement is for the hardware to set all the conflict bits when the register contents are restored from memory. This simple scheme causes performance penalty only when the context switch occurs after a preload instruction has been executed but prior to the corresponding check instruction. Setting all conflict bits ensures all conflicts which were interrupted by the conflict switch are honored, but may cause some unnecessary invocations of correction code. The scheme also handles virtual address aliasing across multiple contexts. However, from our experience, this overhead is negligible for systems with context switch intervals of more than 100k instructions.

1.5 Speculative Execution

Speculative execution has been used in the literature to refer to executing an instruction before knowing that its execution is required. By moving an instruction above preceding conditional branches, an instruction is executed speculatively. Here, we extend the definition of speculative execution to refer to executing an instruction before knowing that it can be executed correctly. Instructions thus executed will be referred to as speculative instructions. In particular, a preload and its dependent instructions are executed before knowing if the preload will conflict with a store. The execution of these speculative instructions must be corrected if a conflict occurs.

Figure 4A:
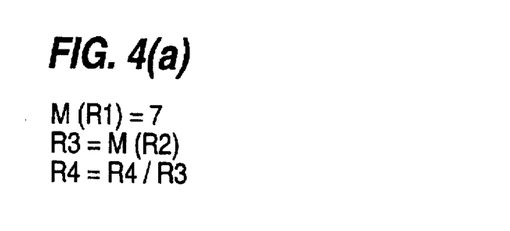
FIG. 4(a) and 4(b) respectively illustrate original code and MCB code in an example of speculative execution of excepting instructions according to the present invention.
Figure 4B:
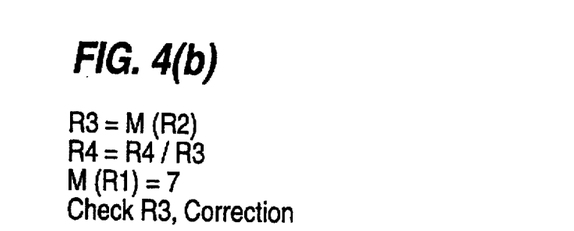

There are two aspects of correcting the execution of speculative instructions. One is to correct the values generated by these instructions. The compiler algorithm fulfills this requirement through intelligent compile-time renaming and register assignment. The more difficult aspect is to correctly handle exceptions. Since the value preloaded into the register may not be correct, there is a chance that a flow dependent instruction that uses the preload result may cause an exception. In the example in FIG. 4, if r1 equals r2, then the value 7 is loaded into r3 in the original code segment. However, the value 0 may be preloaded into r3, in which case the divide instruction will cause an exception. Since the exception is due to an incorrect execution sequence, it must be ignored.

A solution is to provide architectural support to suppress the exceptions for speculative instructions [R. P. Colwell, R. P. Nix, J. J. O'Donnell, D. B. Papworth, and P. K. Rodman, "A VLIW architecture for a trace scheduling compiler," in *Proceedings of the 2nd International Conference on Architectural Support for Programming Languages and Operating Systems*, pp. 180–192, April 1987.]. A potential trap-causing instruction executed speculatively should be converted into the non-trapping version of the instruction. Therefore, the exception caused by the divide instructions in the example above would be ignored. However, the exception should be reported if there is no conflict between the preload and the store. Several schemes for precise exception detection and recovery have been proposed [S. A. Mahlke, W. Y. Chen, W. W. Hwu, B. R. Hau, and M. S. Schlansker, "Sentinel scheduling for superscalar and VLIW processors," in *Proceedings of the 5th International Conference on Architectural Support for Programming Languages and Operating Systems*, pp. 238–247, October 1992.], [R. A. Bringmann, S. A. Mahlke, R. E. Hank, J. C. Gyllenhaal, and W. W. Hwu, "Speculative execution exception recovery using write-back suppression," in *Proceedings of 26th Annual International Symposium on Microarchitectures*, December 1993.], [M. D. Smith, M. S. Lam, and M. A. Horowitz, "Efficient superscalar performance through boosting," in *Proceedings of the 5th International Conference on Architectural Support for Programming Languages and Operating Systems*, pp. 248–259, October 1992.].

1.6 Memory Mapped I/O and Synchronization Issues

In a processor with memory-mapped I/O, the fact that a load instruction accesses an I/O register cannot be detected at compile time in general. Similarly, in some architectures, a load instruction may be used to signal an event to other processors in the system. These special load instructions may be converted into preloads and allowed to move about stores. However, they must not take effect until after the stores.

The memory-mapped I/O loads and synchronization loads are detected by the address translation mechanism. Although virtual addresses may be used to access the memory conflict buffer for speed, the address translation is done in parallel. If a memory-mapped I/O preload or a synchronization preload is detected, the destination register number of the preload is used to index into the conflict vector to set the selected conflict bit. The hardware simply discards the preload. This ensures that the memory-mapped I/O loads and synchronization loads thus detected will be retried due to their check instructions.

1.7 Exception Handling For Preloads

If preload instruction is moved above conditional branches and causes an exception, one can handle the exception precisely. If the processor has a sentinel mechanism, treating the preloads as a speculative instruction will naturally cover the exception. Otherwise, one can add an exception bit into the conflict vector so that a check instruction signals the exception. In this case, the check instruction must remain in the home basic block as in the case in the algorithm in Section 2.2.

1.8 Correction Mechanism

Figure 7:
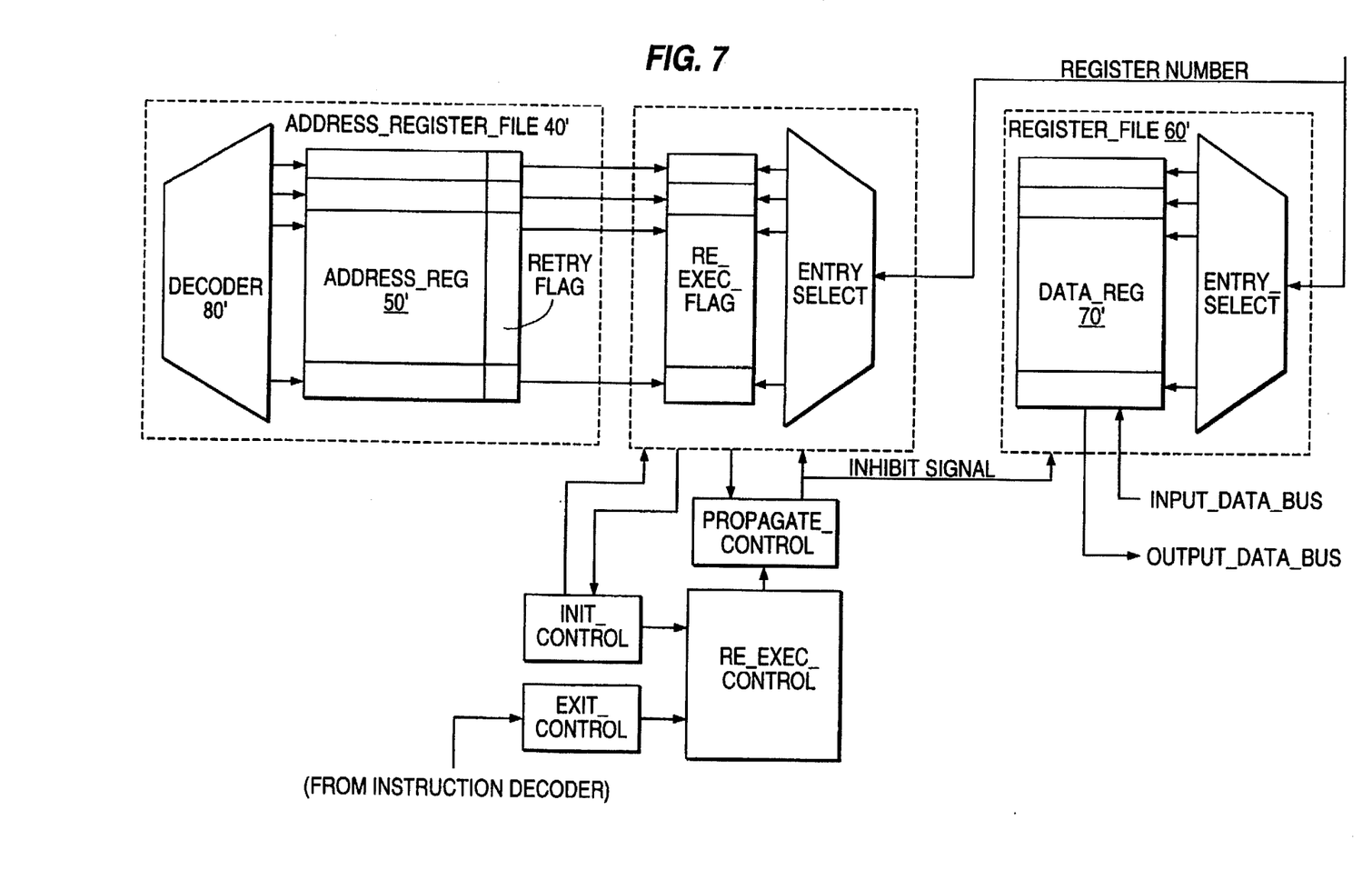
FIG. 7 illustrates a configuration employed when incorrect program execution due to pre-loads is detected.

Referring to FIG. 7, when a conflict condition is detected, the load instruction and its dependent instructions which have been executed thus far must be corrected. Two methods are currently known for this purpose. In the first method, the compiler generates a new sequence of instructions that consist of the load and its dependent instructions executed before the conflict condition is detected. In the second method, the processor enters a re-execution mode when a conflict condition is detected. The program counter is rolled back to the preload. Instructions are selectively re-executed until the processor state is corrected. A re-execution flag is provided for each data register entry. The re-execution control monitors the state of the re-execution.

When a re-execution is initiated, the re-execution flag of the preload register which should be re-executed is set to re-execute. If multiple preload instructions need to be re-executed, individual re-execution flag is set. Whenever the re-execution flag is set, the corresponding retry flag is reset. Instruction fetch and execute enters into the re-execution mode. During subsequent re-execution, if the re-executed flag of any data register specified by the operation is set to re-execute, the computation result is stored to the destination data register, and the re-execution flag of the destination data register is set to re-execute. In the case of multiple preload instruction re-execution, the re-execution flags are propagated at the same time. If none of the re-execution flag of the source data register specified by the operation is set to re-execute, the computation is discarded or the re-execution itself is avoided. When the commit which initiated the re-execution appears, re-execution mode is terminated.

In FIG. 7, reference numeral 40' represents an address register file, reference numeral 50' represents an address register, reference numeral 80' represents a decoder, reference numeral 60' represents a register file and reference numeral 70' represents a data register.

1.9 Likely Same Loads

Figure 6:
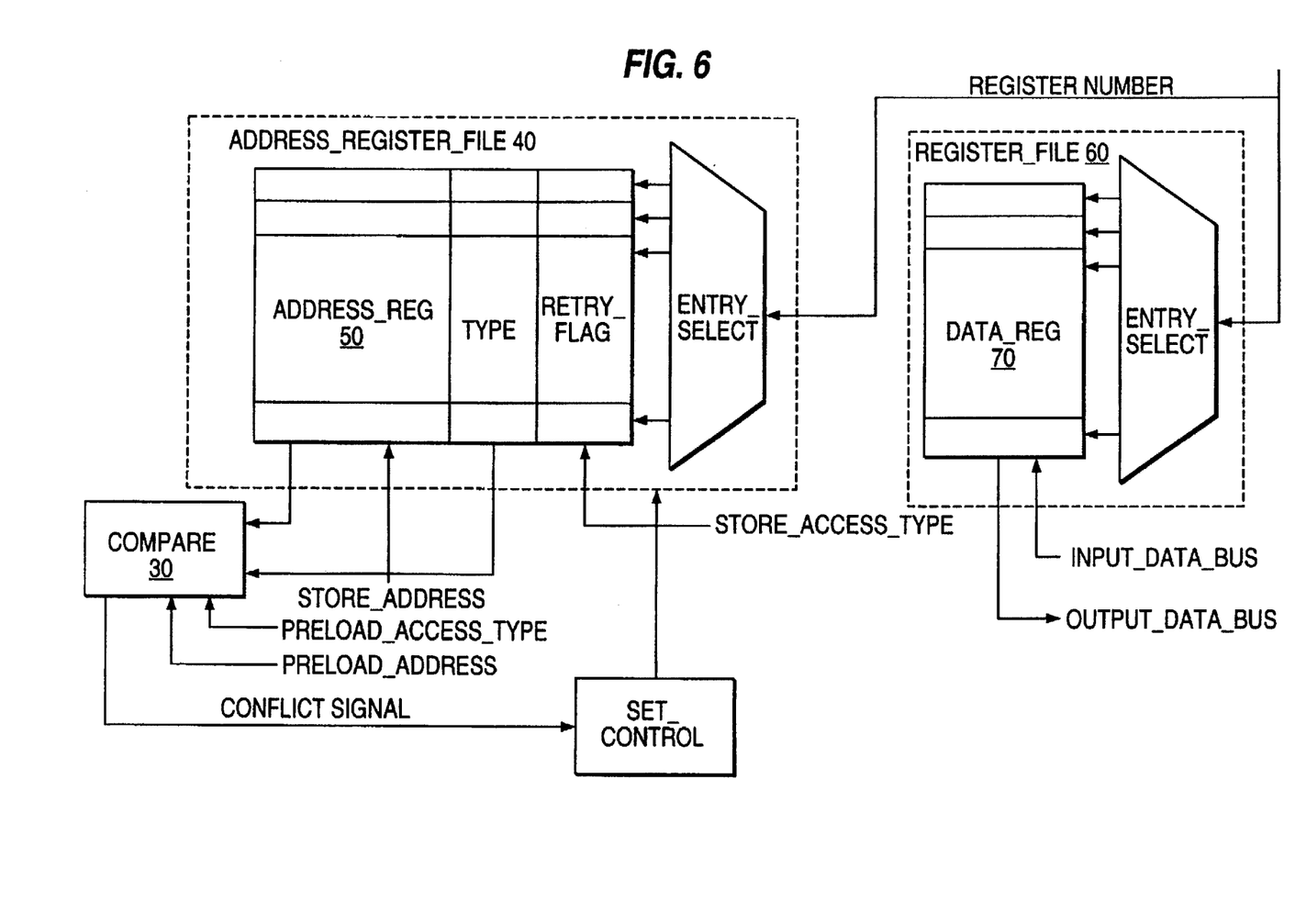
FIG. 6 illustrates a configuration used for detecting errors caused by fetching and executing flow dependent instructions on a memory load instruction before fetching or executing the memory load instruction.

The mechanism shown in FIG. 6 provides support for detecting errors caused by fetching and executing flow dependent instructions on a memory load instruction before fetching or executing the memory load instruction. The data used for computation is taken from the stored data of a previous memory store instruction.

As before, the preload instruction deposits the preload address into the preload array. The likely same flag in the preload array is set by the preload also. Therefore, a conflict condition occurs when store does not access the same location as the load. The preload, however, does not access memory.

When executing a memory store operation, the memory address of the store is compared with the addresses in the preload array. If the compared addresses are not exactly the same, the conflict bit is set as before. The check instruction, same as the unlikely same case, looks at the setting of the conflict bit. If the conflict bit is set, the check initiates a re-execution to recover the correct program state.

As the validation of implement, auto-loading can be selected. In this case, check-load operation initiates loading when the addresses are not exactly the same in consideration of access time.

In FIG. 6, reference numeral 40 represents an address register file, reference numeral 50 represents an address register, reference numeral 30 represents a comparator, reference numeral 60 represents a register file and reference numeral 70 represents a data register.

| computations | computations |
|---|---|
| ... | ... |
| r3 <– computations | preload r3 |
| store r3 (likely same) | r3 – computations |
| ld r1 (likely same) | R2 <– r3 opr4 |
| r2 <– r1 opr4 | r6 <– r2 opr5 |
| r6 <– r2 opr5 | store r3 |
| | check r3 |

1.10 Other MCB Designs

As suggested above, the set-associative structure of FIG. 3 was developed in consideration of scalability, access time and physical size constraints. However, the invention is not limited to the structure of FIG. 3, and other MCB hardware designs may be contemplated, including full scale designs and other subset designs employing fully associative structures. It is intended that such configurations, which are readily designable by those skilled in this art, fall within the scope of the MCB invention.

1.11 Experimental Evaluation

The MCB approach of the present invention has been subjected to experimental evaluation as described in a publication entitled "Dynamic Memory Disambiguation Using The Memory Conflict Buffer", David M. Gallagher et al., ASPLOS VI Proceedings (pp. 183–193), Oct. 4–7, 1994. This publication, and all other publications mentioned herein, are incorporated by reference into this disclosure.

Also incorporated herein by reference is a University of Illinois at (Urbana-Champaign) Invention Disclosure entitled "Memory Conflict Buffer", published in June, 1994.

2.1 Compiler Aspects

To take full advantage of the MCB hardware support, a compiler must be able to intelligently reorder ambiguous store/load pairs, insert check instructions, and generate correction code. The compiler must also take into account the side-effects of aggressive code reordering. For example, over-speculating preload instructions can significantly increase register pressure and could result in a loss of performance due to spilling. In this section, we discuss the algorithms built into the IMPACT C compiler for exploiting the MCB support.

2.2 Basic MCB Scheduling Algorithm

To expose sufficient instruction-level parallelism (ILP) to allow effective code scheduling, the compiler must be able to look beyond basic block boundaries. In the IMPACT compiler, basic blocks are coalesced to form superblocks [W. W. Hwu, S. S. Mahlke, W. Y. Chen, P. P. Chang, N. J. Warter, R. A. Bringmann, R. G. Ouellette, R. E. Hank, T. Kiyohara, G. E. Haab, J. G. Holm, and D. M. Lavery, "The Superblock; An effective technique for VLIW and superscalar compilation," *Journal of Supercomputing*, vol. 7, pp. 229–248, January 1993.], an extension of trace-scheduling [J. A. Fisher, "Trace scheduling; A technique for global microcode compaction," *IEEE Transactions on Computers*, vol. c-30, pp. 478–490, July 1981.], which reflect the most frequently executed paths through the code. Superblocks have a single entrance (at the beginning of the superblock), but may have multiple side exits. The superblock is the basic structure for scheduling in the IMPACT compiler.

The basic MCB algorithm involves the following steps for each frequency executed superblock:

1. Build the dependence graph.
2. Add a check instruction immediately following each load instruction, inserting necessary dependencies.
3. For each load, remove store/load memory dependencies.
4. Schedule the superblock, removing any unnecessary check instructions.
5. Insert required correction code.

Figure 5A:
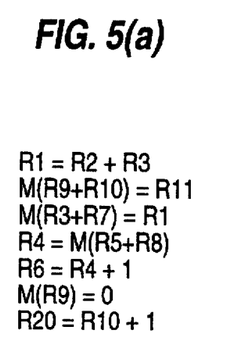
FIGS. 5(a), 5(b), 5(c) and 5(d) respectively illustrate original code, dependencies to check instruction, tail duplication code and tail duplication deleted in an example of MCB code compilation according to the present invention.
Figure 5B:
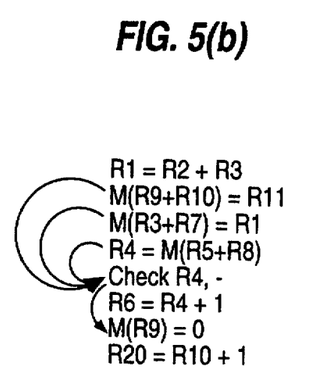

The initial preparations for code scheduling, including building the dependence graph, are unchanged by the MCB algorithm. After the dependance graph has been built, a check instruction is added after each load instruction in the superblock. The destination register of the load becomes the source operand of the check, making the check instruction flow dependent upon the load. Initially, the correction block of the check is not defined. During code scheduling, the check instruction must maintain correct dependencies; thus, it must be dependent upon the load and also inherit some of the load's dependencies. Because we want flow dependent instructions of the load to be able to bypass the check, the check inherits only memory and control dependencies from the load. Dependencies to the previous and subsequent branch instructions are also added to the check instruction to ensure it remains with the load's original basic block. FIGS. 5(a) and 5(b) show the code from our previous example, and the code with the check instruction and its dependencies inserted.

The next step in MCB scheduling is to remove store/load dependencies. For each load, the algorithm searches upward, removing any dependence arcs to store instructions not determined to have a definite dependency. Associated with each load, the algorithm maintains a list of store instructions whose dependence has been removed. The algorithm currently only removes dependencies to stores which precede the load, i.e., only removes flow dependencies. Removing such dependencies can be done using the same MCB hardware. To limit over-speculation of loads, the algorithm limits the number of store/load dependencies which can be removed for each load. If too many dependence arcs are removed, our greedy scheduling algorithm is likely to move the load far ahead of its initial position, needlessly increasing register pressure and the probability of false conflicts in the MCB. Additionally, the algorithm ensures that dependencies are formed between the load instruction and any subroutine call in the superblock, preventing loads from bypassing subroutine calls. Thus, no MCB information is valid across subroutine calls.

Next, the superblock is scheduled. Each time a load instruction is scheduled, the list of stores associated with the load is examined. If all stores on the list have already been scheduled, the load did not bypass any stored during scheduling, and the associated check instruction can be deleted. The flow dependency between the load an the check ensures the check cannot be scheduled prior to the load; thus deletion of the check (and removal of its dependencies) does not impact instructions already scheduled. If the load is determined to have bypassed a store during scheduling, the load is converted to its preload form. In our current implementation, one check instruction is required for each preload instruction. However, multiple check instructions could potentially be coalesced to reduce the execution overhead and code expansion incurred by the potentially large number of checks. Because the check is a single-operand instruction, extra bits should be available to accommodate a mask field to specify a set of registers which are to be checked by this instruction. For example, if a register bank with 64 registers is partitioned into eight sets of eight registers each, the check instruction would use three bits to specify which banks was being check, and eight bits to specify the register mask. The coalesced check would branch to conflict correction code, which would have to provide correct execution regardless of which preload instruction experienced a conflict.

2.2 Inserting Conflict Correction Code

The compiler provides conflict correction code for each preload instruction. When a check instruction determines a conflict has occurred, it branches to the correction code. The correction code re-executes the preload instruction and all dependent instructions up to the point of the check. (In the infrequent case that the load has bypassed a single store, and the load data is of the same size and alignment of the store data, the correction code can replace the re-execution of the preload with a simple move from the store's source register. In fact, the move itself may become unnecessary via forward copy propagation.) The original load instruction will not be a preload within correction code (because its check has already occurred), but any dependent instructions which happened to be preloads must be re-executed as preloads. During insertion of correction code, the compiler must check for any anti-dependencies which would over-write source operands, such that these operands would not be available for execution within correction code. If anti-dependencies are detected, they are removed by virtual register renaming.

Figure 5C:
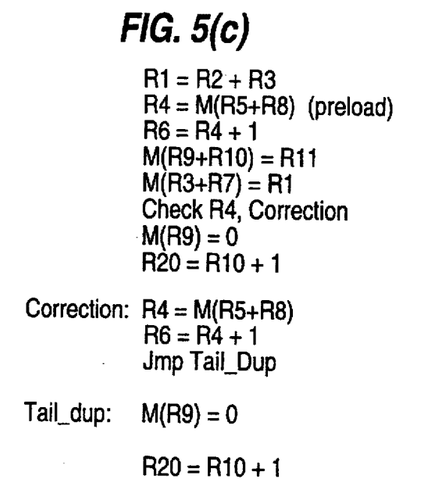
Figure 5D:
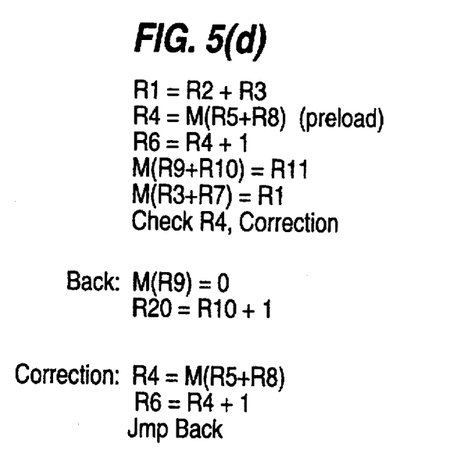

Because scheduling is performed on superblocks which do not allow side entrances, the correction code cannot jump back into the superblock after re-executing the required instructions. Instead, the correction code jumps to tail duplication code, which is simply a duplicate copy of all superblock instructions subsequent to the check instruction. This tail duplication code (FIG. 5(c)) ensures all dependencies and register five ranges are calculated correctly during register allocation and post-pass scheduling. Following post-pass scheduling, however, the superblock structure is no longer necessary to the compiler and the code can be restructured to allow jumps back into the superblock. At this point, all jumps within correction code are redirected to jump back into the superblock immediately following the check instruction, and all tail duplication code can be deleted. Thus, the tail duplication code is only a temporary tool used by the compiler to maintain correct dependencies and live ranges during register allocation and post-pass scheduling, and is removed prior to the final code generation (FIG. 5(d)).

Also, although not yet fully developed, it should be noted that the so-called Hyperblock technique may prove to be suitable for the invention. ["Effective Compiler Support for Predicated Execution Using the Hyperblock", S. A. Mahlke et al., The 25th Annual International Symposium on Microarchitecture MICRO 25, Dec. 1–4, 1992.]

What is claimed:

1. In a computer having a register bank and a device for operand fetch and instruction execution, an apparatus for monitoring a store address to maintain coherency of preloaded data that is fetched by a load operation and should be effected by at least one subsequent store operation, said apparatus comprising:

an address register bank having entries for holding the address of a load having loaded data which should be affected by at least one subsequent store operation, each of said entries of said address register bank being related to each entry of said register bank which can hold preloaded data, each of said entries of said address register bank having associated therewith a pre-load flag and a type field, said pre-load flag being set when the load is executed and reset when there is no need to be affected by a subsequent store operation, said type field having the information denoting an access type;

comparison means for comparing the address held in said address register bank with the address of a subsequent store operation in consideration of the access type held in said type field when said pre-load flag is set; and means for resetting said pre-load flag specified by operation when special operations which terminate monitoring addresses are detected or the value is updated by non-preload operations, wherein each of said entries of said address register bank has associated therewith a retry flag which is set when the preloaded data is invalid and reloading is required at the point of usage, and wherein said apparatus further comprises means for reloading the data from the address of said address register with the access type held in said type field when the preloaded data whose said retry flag is set is being used.

2. The apparatus recited in claim 1, wherein each of said entries of said address register bank has associated therewith an exception flag which is set when the preload causes exception and activation is required at the point of usage.

3. The apparatus recited in claim 1, wherein said comparison means includes means to keep subset of the addresses with access type held in said address register bank and said type field, being added new preloaded address when it is added to said address register bank, and being removed when said pre-load flag is reset, and wherein said apparatus further comprises means for storing said retry flag when addition of new address to said comparison means requires the spill out of preloaded address whose said pre-load flag is set.

4. In a computer having a register bank and a device for operand fetch and instruction execution, an apparatus for monitoring a store address to maintain coherency of preloaded data that is fetched by a load operation and should be effected by at least one subsequent store operation, said apparatus comprising:

an address register bank having entries for holding the address of a load having loaded data which should be affected by at least one subsequent store operation, each of said entries of said address register bank being related to each entry of said register bank which can hold preloaded data, each of said entries of said address register bank having associated therewith a pre-load flag, a type field and a retry flag, said pre-load flag being set when the load is executed and reset when there is no need to be affected by a subsequent store operation, said type field having information denoting an access type, said retry flag being set when the preloaded data is invalid and reloading is required at the point of usage;

comparison means for comparing the address held in said address register bank with the address of a subsequent store operation in consideration of the access type held in said type field when said pre-load flag is set;

means for setting said retry flag when said comparison means detect that the locations thus accessed overlap; and means for resetting said pre-load flag specified by operation when special operations which check the preload status are detected or the value is updated by non-preload operations.

5. The apparatus recited in claim 4, wherein each of said entries of said address register bank has associated therewith an exception flag which is set when the preload causes exception and activation is required at the point of usage.

6. In a computer having a register bank and a device for operand fetch and instruction execution, an apparatus for monitoring a store address to maintain coherency of preloaded data that is fetched by a load operation and should be effected by at least one subsequent store operations, said apparatus comprising:

comparison means having entries for holding a subset of the addresses of load together with an access type and a register number, whose loaded data held in said register bank should be affected by a subsequent storing operation, and comparing addresses held in said entries with subset of the address of the store operation in consideration of said access type, said register number showing the entry of said register bank;

a conflict vector having entries for holding a retry flag and a preload pointer, each of said entries of said conflict vector being related to each entry of said register bank which can hold preloaded data through said preload pointer, said retry flag being set when the preloaded data is invalid and reloading is required at the point of usage;

means for setting said retry flag when said comparison means detect that the addresses are the same location and when addition of a new address to said comparison means requires spilling out an already existing preloaded address; and means for invalidating the entry of said comparison means according to the entry of said register bank which is specified by operation when special operations which check the preload status are detected or the value is updated by non-preload operations.

7. The apparatus recited in claim 6, wherein each of said entries of said address register bank having associated therewith an exception flag which is set when the preload causes exception and activation is required at the point of usage.

8. In a computer having a register bank and a device for operand fetch and instruction execution, an apparatus for monitoring a store address to maintain coherency of the preloaded data that is fetched by the load operation and should be effected by at least one subsequent store operation, said apparatus comprising:

an address register bank having entries for holding the address of a store operation, each of said entries of said address register bank being related to each entry of said register bank, each of said entries of said address register bank having associated therewith a type field and a retry flag, said type field having information denoting an access type, said retry flag being set when the preloaded data is invalid and reloading is required at the point of usage;

comparison means for comparing the address held in said address register bank with an address provided by special operations for use in performing a check in consideration of the access type held in said type field; and means for setting said retry flag when said comparison means detect that the addresses are at different locations.

9. In a computer having a register bank and a device for operand fetch and instruction execution, an apparatus for maintaining coherency of the stored data that is saved by the store operation and should be reused instead of a subsequent load operation, said apparatus comprising:

an address register bank having entries for holding the address of a store operation, each of said entries of said address register bank being related to each entry of said register bank, each of said entries of said address register bank having associated therewith a type field, said type field having information denoting an access type;

comparison means for comparing the address held in said address register bank with an address provided by special operations for use in performing a check in consideration of the access type held in said type field; and control means for loading data from the address provided by said special operations and which is used for comparing addresses by said comparison means when said comparison means detect that the addresses are at different locations.

10. In a computer having a register bank and a device for operand fetch and instruction execution, an apparatus for re-executing only subsequence of operations that depend on the data which should be re-executed in a re-execution mode, said apparatus comprising:

re-execution flag set having re-execution flags for holding the information of re-execution, which is set when the data should be re-executed or is the result of re-execution, each of said re-execution flags being related to each entry of said register bank;

control means for activating re-execution of operations when at least one said re-execute flag of operands is set;

propagate means for setting said re-execution flag when the operations activated by said control means update the entries of said register bank; and means for exiting re-execution mode when special operation which initiate the re-execution mode appears.

11. In a computer having a register bank and a device for operand and instruction execution, an apparatus for monitoring a store address to maintain coherency of and update preloaded data that is fetched by a load operation and should be effected by at least one subsequent store operation, said apparatus comprising:

an address register bank having entries for holding the address of a load having loaded data which should be affected by at least one subsequent store operation, each of said entries of said address register bank being related to each entry of said register bank which can hold preloaded data, each of said entries of said address register bank having associated therewith a pre-load flag and a type field, said pre-load flag being set when the load is executed and reset when there is no need to be affected by a subsequent store operation, said type field having the information denoting an access type;

comparison means for comparing the address held in said address register bank with the address of a subsequent store operation in consideration of the access type held in said type field when said pre-load flag is set;

means for replacing the loaded data with the data stored by a subsequent store operation when said comparison means detects that said address are the same location; and means for resetting said pre-load flag specified by operation when special operations which terminate monitoring addresses are detected or the value is updated by non-preload operations.

12. The apparatus recited in claim 11, wherein each of said entries of said address register bank has associated therewith an exception flag which is set when the preload causes exception and activation is required at the point of usage.

13. In a computer having a register bank and a device for operand fetch and instruction execution, an apparatus for monitoring a store address to maintain coherency of preloaded data that is fetched by a load operation and should be effected by at least one subsequent store operation, said apparatus comprising:

an address register bank having entries for holding the address of a load having loaded data which should be affected by at least one subsequent store operation, each of said entries being related to each entry of said register bank which can hold preloaded data, each of said entries having associated therewith a pre-load flag, a type field and a retry flag, said pre-load flag being set when the load is executed and reset when there is no need to be affected by a subsequent store operation, said type field having information denoting an access type, said retry flag being set when the preloaded data is invalid and reloading is required at the point of usage;

comparison means for comparing the address held in said address register bank with the address of a subsequent store operation in consideration of the access type held in said type field when said pre-load flag is set;

means for setting said retry flag when said comparison means detect that the addresses are the same location; and means for resetting said pre-load flag specified by operation when special operations which check the preload status are detected or the value is updated by non-preload operations; and wherein said comparison means includes means to keep subset of the addresses with access type held in said address register bank and said type field, being added new preloaded address when it is added to said address register bank, and being removed when said pre-load flag is reset, and wherein said apparatus further comprises means for storing said retry flag when addition of new address to said comparison means requires the spill out of preloaded address whose said pre-load flag is set.

* * * * *